July 20, 1926.

W. C. HODGES, JR 1,593,213

ENDLESS CONVEYER FOR PASSENGERS

Original Filed May 18, 1925  2 Sheets-Sheet 1

William C. Hodges, Jr.
INVENTOR.

BY

ATTORNEY.

July 20, 1926.  
W. C. HODGES, JR  
1,593,213  
ENDLESS CONVEYER FOR PASSENGERS  
Original Filed May 18, 1925    2 Sheets-Sheet 2
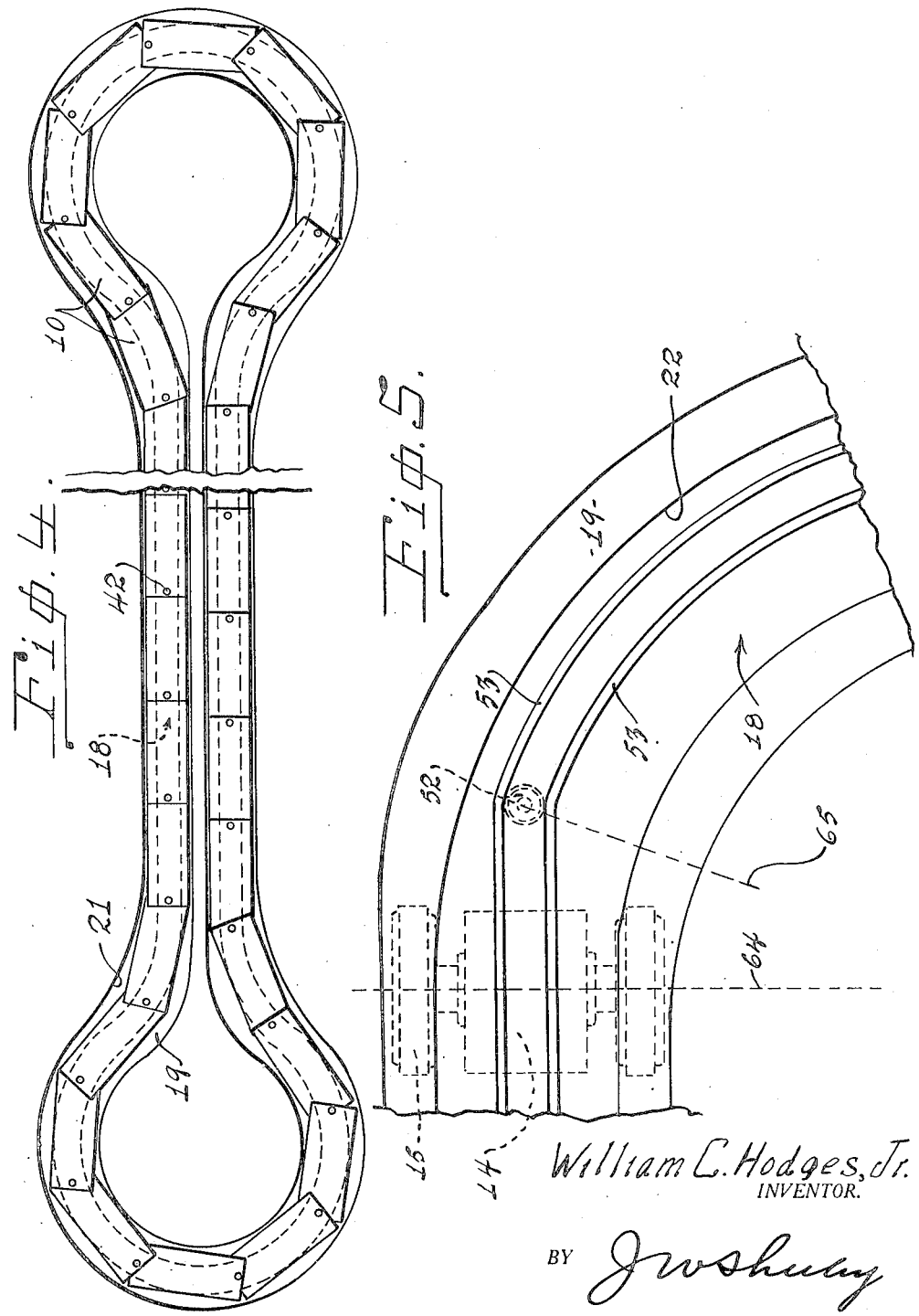

Patented July 20, 1926.

1,593,213

UNITED STATES PATENT OFFICE.

WILLIAM C. HODGES, JR., OF LOS ANGELES, CALIFORNIA, ASSIGNOR TO TUNNELS TRANSPORTATION COMPANY, OF LOS ANGELES, CALIFORNIA.

ENDLESS CONVEYER FOR PASSENGERS.

Application filed May 18, 1925, Serial No. 31,254. Renewed May 13, 1926.

This invention relates to conveyers and pertains more particularly to endless, power driven passenger conveyers.

The invention has for its principal object the provision of an endless conveyer, embodying seats for passengers, which may be operated in lengthy but narrow channels, such as in tunnels or subways of very limited width.

Another object of the invention is the provision of a passenger conveyer of the above described character in which the chairs and all moving parts are always in an upright position.

Another object of the invention is the provision of an endless automotive passenger conveyer in which the usual sprocket wheels, sprocket wheel shafts, and like driving members, together with the usual great multiplicity of links and linked members and idlers are dispensed with; it being among other objects of the invention to provide a construction and arrangement of parts which will not give rise to rapid wear or require frequent and costly adjustments and repairs.

Another object of the invention is to provide a conveyer in which the weight of all moving parts, and the imposed weight of the passengers, may be carried solely on rubber tires so that efficient traction may be had without appreciable noise.

Another object of the invention is the provision of a passenger conveyer which may be operated in a comparatively narrow space, and which will carry passengers in opposed directions, so that a single endless conveyer may have all seats occupied and serve the dual purpose of carrying passengers away from a given point while returning other passengers to such point.

My invention is applicable to a variety of transportation problems and may be carried out in various embodiments, but the specific embodiments which I am about to describe as illustrative of my invention, is designed particularly for use in conveying passengers through narrow tunnels or parallel to moving sidewalks, and for like conditions, where it is advisable to have the outbound portion of the conveyer in close parallel traveling relation to the inbound portion of the conveyer.

Still another object of the invention is to provide an endless passenger conveyer which may be of great length but in which any unit or part thereof is never subjected to more than a predetermined strain, regardless of the length of the conveyer, and in which the driving power is applied at several spaced points throughout the entire length of the conveyer.

A further object of the invention is to provide a passenger conveyer in which the moving parts are not located in pits or like inaccessible places.

Still other objects and advantages will be pointed out hereinafter, and further objects and advantages will be apparent to those skilled in the art as they read the ensuing specification.

I have illustrated one embodiment of my invention, by way of example, in the accompanying drawings, in which, Figure 1 is a view mainly in vertical longitudinal section of two conveyer units hereinafter known as chairs.

Figure 4 is a diagrammatic plan view of a complete embodiment of my invention.

Figure 5 is a plan view of what is hereinafter known as the track; the view being taken on a curve in the track to show the relative arrangement of parts hereinafter described.

Figure 1:
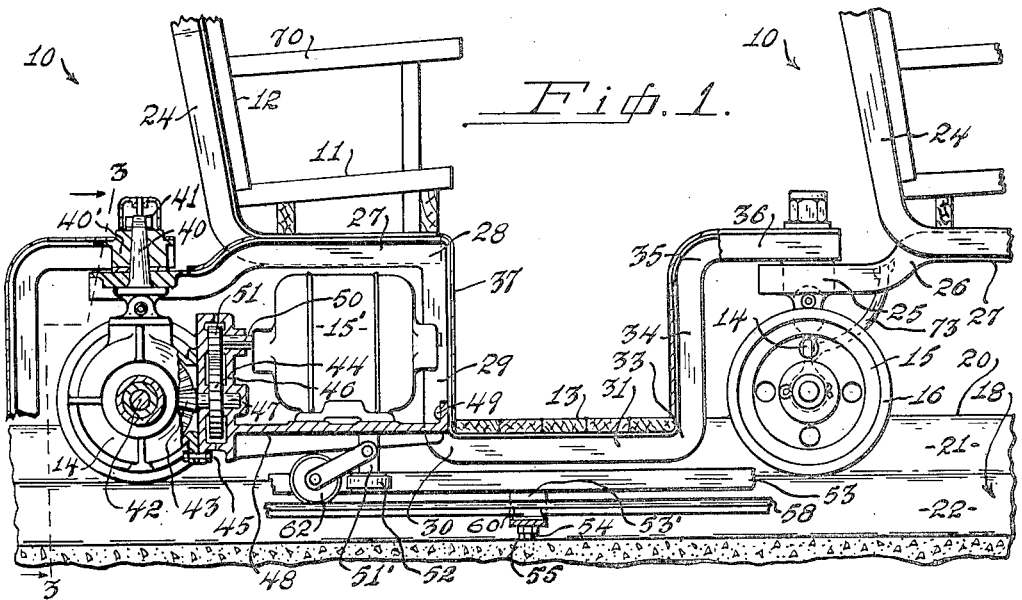
Figure 2:
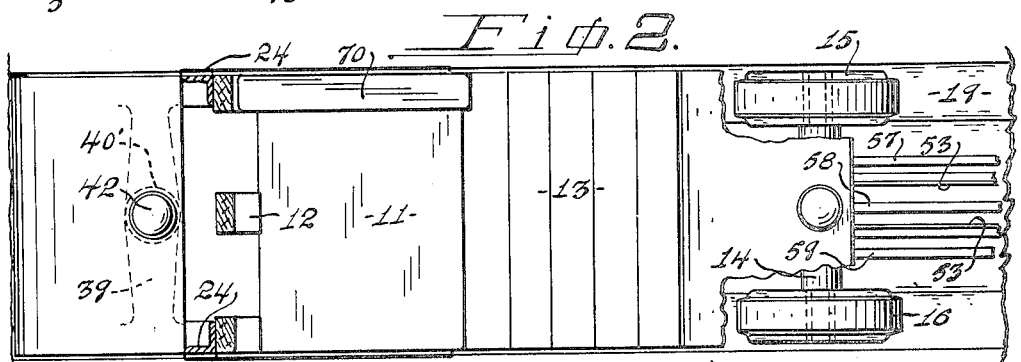
Figure 2 is a plan view thereof.
Figure 3:
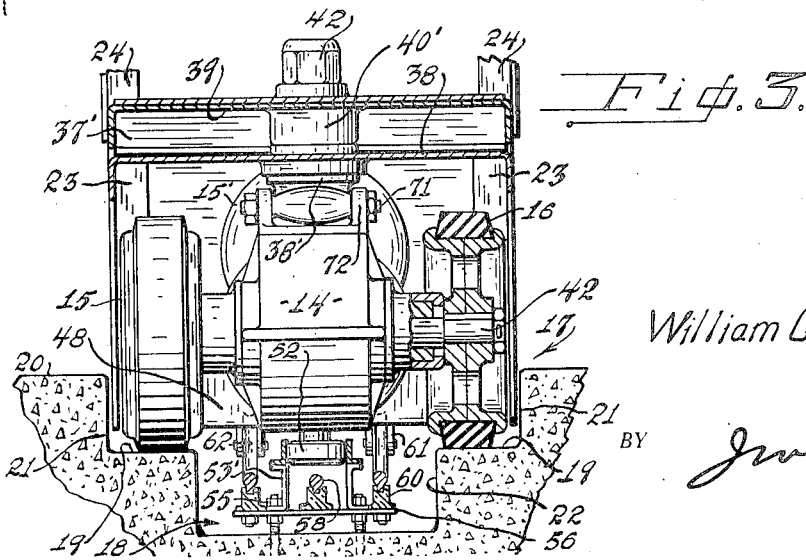
Figure 3 is a view in section on a line 3—3 of Fig. 1 on a larger scale than Figs. 1 and 2.

In carrying out my invention in the embodiment illustrated, a plurality of vehicular units 10 are provided, and such a unit will hereinafter be spoken of as a chair. Each chair includes essentially, a seat 11, a back or back rest 12, a floor 13, an axle member 14, and two wheels 15. The wheels are revoluble relative to the axle member, and are also revoluble independent of each other.

There are two types of chairs employed, the rearmost chair shown in Fig. 1 being known as a power chair and the forward chair being known as a trailer chair. To provide a complete conveyer, a plurality of these chairs are connected to each other by means which will be described hereinafter, so as to form an endless chain or belt. Certain of the chairs, such as each tenth chair, or each twentieth chair, is equipped with an electric motor 15', and accordingly the axle member of a power chair is in the form of a differential housing, while the axle member of a trailer chair is devoid of gears and the like, and is merely a means for revolubly supporting the wheels.

One of the salient features of my invention resides in the provision of rubber tires, such as 16, for all the wheels, so that the smooth riding qualities of an automotive vehicle are enjoyed, to a large extent, particularly as the tires run over practically smooth surfaces at all times.

A track, generally indicated by the numeral 17, is provided for all chairs to run upon, and in all cases the track is made in the form of a complete loop. Considering the track in cross section, it includes a shallow channel 18, bounded on each side by runways 19, 19, each just wide enough to easily accommodate a corresponding wheel. The runways are each located below normal sidewalk level, or ground level, 20, so that the floors of the chairs are on the same level as the sidewalk. Vertical spaces 21—21, connect corresponding parts of the level 20 with corresponding runways. Where curves exist, the space allowed between the vertical surfaces 21, 21, is accordingly increased, although along the straight-aways the space is only slightly greater than the width of a car.

Concrete is preferably used in constructing the runways and for surfacing the sidewalk level and channel. Thus the traction is produced between a practically smooth concrete surface and a resilient tire. With such use of rubber and concrete the chair rides smoothly and quietly, and in the absence of irregularities in the concrete surfaces, no springs are needed between the wheels and the chair seats, although the latter may be comfortably upholstered.

Each chair embodies two main angle-iron frame members 23, 23, identical to each other, as well as two chair back supporting members 24, 24, of similar stock. A short portion 25 of the members 24, 24, extends parallelly on a horizontal plane to a slight curve 26, where they turn to follow a horizontal plane of higher elevation, as at 27. The members then turn, as at 28, continuing vertically downward, as at 29. At 30 said members turn on a horizontal plane so that portions 31 thereof support the floor. At a right angle bend 33, said members turn to extend vertically upward, as at 34. At a curve 35 the members again turn to a horizontal plane and continue along said plane, as at 36, on a level of the portions 27. Throughout the entire length the two frame members are parallel and spaced apart an unchanging distance. It will be seen that the parts 36 of one chair overlay parts 25 of a preceding chair. A sheet metal covering 37 is laid over the frame so that a passenger is protected from the motor which is under the seat, and from the wheels of the forward chair. Over the curved portions 26, of members 24, of each chair, there is laid a shield or covering 37'. The members 24, 24, are attached directly to the members 23 and provide a frame for the back rest.

The rear end of the frame members are tied together by a rigid member 38, and the front ends are tied together by a similar member 39. Member 38 carries a vertical pin or stub axle 40, and member 39 carries a fixed sleeve or bearing 40' into which the pin extends. A nut 41 and a hub cap 42 hold the pin and sleeve to each other while allowing for relative rotary movement. Thus each chair is pivotally connected to the chair ahead, and all the chairs so connected provide an endless flexible belt capable of following a loop track, and further capable of transporting passengers in two opposed directions.

The axis of the pin and sleeve, or in other words, the pivot point at which two cars are connected, is in vertical alignment with the horizontal axis of the wheels of the chair. In taking a curve there are times when one chair is still traveling straight ahead while the next chair is turning. In such case the axle member of the preceding chair pivots around said pivot point and the wheels are enabled to follow corresponding arcs of the curve without one wheel falling behind the other and without resultant side-slip.

Each power chair is provided with the aforementioned differential housing which encloses a common automotive type of differential mechanism, (not shown complete) such as is well understood and needs no description herein. It is to be understood that in the case of the power chair just as in any vehicle in which there is a planetary differential, the axle 42 is divided at a point (not shown) within the housing and accordingly one wheel may travel at a speed differing from that of the other wheel. The differential mechanism includes a pinion shaft 43, which has ample bearing in a gear housing 44. The latter is bolted to the differential housing, as at 45. Within the gear housing a large driven gear 46 is provided which is carried by the pinion shaft 47. Substantially integral with the gear housing a horizontal motor base 48 is provided to support the motor, and the base is riveted, as at 49, to the frame members of the chair. The motor shaft 50 carries a gear 51 meshing with the driven gear, and thus the motor drives the wheels at reduced speed through the differential.

In conformance with a salient feature of the invention a rigidly depending member 51' is provided centrally of the base and carries a small horizontally disposed guide wheel 52. Said guide wheel is arranged to run between two spaced guide rails 53, 53. Any suitable means may be employed for anchoring the guide rails, but in the embodiment illustrated spaced bolts 54 are embedded in pairs, at suitable intervals in the concrete. The guide rails are held relative to the bolts by being clamped between nuts 55.

The said bolts and nuts also provide for holding lateral bars 56, which support three power rails 57, 58 and 59, respectively. The power rails are insulated from the bars by insulation blocks 60. Trolleys, such as 61, with trolley wheels 62, are carried by the chair or motor base. Although not specifically shown in the drawings it is to be understood that said trolleys are connected with the motor by suitable wiring (not shown) so as to provide for the motor taking its power from the rails.

The guide rails are kept substantially the same distance apart throughout the entire track, and on the straight-aways or tangents, said guide rails are in the center of the track. It will be seen now that as the chairs travel, the guide wheel of each chair will guide that chair, and as each chair moves on to a curve the chair and the axle member are free to pivot with regard to the following chair, and such pivot point is in vertical alignment with the common horizontal axis of the wheels. The guide wheel is spaced well forward of the said pivot point; the distance being limited, as will appear hereinafter, by a certain relation between the width of the channel and the smallest radius of the track curves.

In Fig. 5 of the drawings there is shown a line diagram of the track and guide rails showing the relative positions thereof at a curve. For proper traction and operation of the wheels, and the entire train as a whole, the pivot points of the chair should always follow the true center line of the tracks, on curves as well as tangents.

Since the guide wheel is forward of the pivot point, it is evident that it cannot be centrally of the track, on a curve, if the pivot point is centrally thereof. Therefore the guide rails are peculiarly laid out on the curves so that the said pivot points invariably follow the center line of the track. In the diagram just mentioned, it will be seen that a curve begins on a line 64, for instance, whereas the guide rails continue past this line to a line 65, before it begins to curve. From this point on, the guide rails follow a curve such as will keep the pivot points of the chair central of the track, and such curve will bring the guide rails quite close to the sides of the channel, at times. Proper arrangement of the guide rails relative to the tracks, at the curves, as well as the correct allowance of clearance between chair and concrete side walls need not be considered further, as such are well understood by those skilled in the allied arts.

From the foregoing it will be apparent that a complete endless train of chairs, comprising a very large number of same, may be employed for transporting passengers. Such a conveyer may be used in conjunction with a moving sidewalk, (not shown), arranged to travel at the same or slower speed, or such side walk may be employed merely for loading purposes. The conveyer is well suited for the conditions where only small curves are allowable and where the straight-aways are allowed only a very narrow space. The outgoing and incoming parts of the conveyer may be caused to travel in close parallel relation, and while each chair is practically a complete vehicle in itself, it requires only two wheels.

In the operation of the conveyer, power is controlled from points removed from the conveyer. Each power chair contributes its share of traction to the entire unit and failure of one or more motors does not necessitate a stop. The conveyer is run continuously and passengers step from the stationary concrete sidewalk, or from a moving sidewalk, as the case may be, on to the floor of the chair, which is on the same level. Seated in the chair the passenger rides to the other end-curve and there alights. Simultaneously other passengers are traveling in the other direction. Where traffic is heavy all chairs, except those on the curves, may be employed, and in the case of a long conveyer, the percentage of chairs not in use is small, whereas in usual conveyers and traveling sidewalks, less than one half of the available space can be occupied, and such conveyers and traveling side walks can convey passengers in one direction only.

While I have shown and described a specific embodiment of my invention, I do not limit myself to any specific construction or arrangements of parts, and may alter same as I desire without enlarging the scope of my invention as defined by the appended claims.

I claim,

1. In a conveyer of the class described, a plurality of vehicles connected to each other in endless belt arrangement; certain of the vehicles being automotive, spaced traction wheels to said vehicle, spaced non-guiding runways forming an endless track on which the wheels of the vehicles run, spaced guiding rails intermediate of the runways, and a wheel carried revolubly by each vehicle coacting with the runways to guide the corresponding vehicle; said wheels being revoluble on a vertical axis.

2. In a conveyer of the class described, a plurality of two wheeled vehicles pivotally connected in endless belt arrangement; certain of the vehicles being automotive, spaced traction wheels to said vehicle, spaced non-guiding runways forming an endless track on which the wheels of the vehicles run, spaced guiding rails intermediate of the runways, and a wheel carried revolubly by each vehicle coacting with the runways to guide the corresponding vehicle; said wheels being revoluble on a vertical axis.

3. In a conveyer of the class described, an endless track, a plurality of vehicles in upright position completely filling said track and connected to each other in endless belt arrangement; certain of the vehicles being automotive, spaced traction wheels to said vehicle, spaced non-guiding runways forming an endless track on which the wheels of the vehicles run, spaced guiding rails intermediate of the runways, and a wheel carried revolubly by each vehicle coacting with the runways to guide the corresponding vehicle; said wheels being revoluble on a vertical axis.

4. In a conveyer of the class described, a plurality of two wheeled vehicles pivotally connected in endless belt arrangement; the forward end of each vehicle being devoid of wheels and being supported solely by the preceding vehicle, spaced traction wheels to said vehicle, spaced non-guiding runways forming an endless track on which the wheels of the vehicles run, spaced guiding rails intermediate of the runways, and a wheel carried revolubly by each vehicle coacting with the runways to guide the corresponding vehicle; said wheels being revoluble on a vertical axis.

5. In a conveyer of the class described, a plurality of vehicles, each comprising an axle member fixed to extend transversely of the rear end of the vehicle, a pair of wheels revolubly carried by the axle member, a frame having its rear end above said wheels and extending forward in a generally horizontal direction to provide a seat supporting portion, the frame thence extending downward to a suitable floor level, thence forwardly on said floor level, thence upwardly to substantially the elevation of the said rear of the frame, and thence forwardly on such elevation; the first mentioned portion of the frame of one vehicle being pivotally connected to the last mentioned portion of the adjacent vehicle whereby each pair of wheels supports the rear end of one vehicle and the front end of an adjacent vehicle, each vehicle being so connected to the next vehicle as to provide an endless automotive belt; certain of the vehicles being provided with motors.

6. In a conveyer of the class described, a plurality of vehicles, each comprising an axle member fixed to extend transversely of the rear end of the vehicle, a pair of wheels revolubly carried by the axle member, a frame having its rear end above said wheels and extending forward in a generally horizontal direction to provide a seat supporting portion, the frame thence extending downward to a suitable floor level, thence forwardly on said floor level, thence upwardly to substantially the elevation of the said rear of the frame, and thence forwardly on such elevation; the first mentioned portion of the frame of one vehicle being pivotally connected to the last mentioned portion of the adjacent vehicle whereby each pair of wheels supports the rear end of one vehicle and the front end of an adjacent vehicle, each vehicle being so connected to the next vehicle as to provide an endless automotive belt; certain of the vehicles being provided with motors; such motor being disposed under the seat supporting portion of the frame, and a differential carried by said axle member through which the motor drives the wheels of that vehicle.

7. A conveyer, including an endless arrangement of vehicles as in claim 5, guiding means forming an endless loop, means carried by each vehicle adapted to coact with the guiding means to cause the vehicles to travel in the path of said guiding means, and non-guiding runways to either side of the guiding means on which the wheels of the vehicles may run.

8. A conveyer, including an endless arrangement of vehicles as in claim 6, guiding means forming an endless loop, means carried by each vehicle adapted to coact with the guiding means to cause the vehicles to travel in the path of said guiding means, and non-guiding runways to either side of the guiding means on which the wheels of the vehicles may run.

9. In a conveyer, a plurality of vehicles, a pair of rear wheels to each vehicle, a differential for the wheels of certain of the vehicles, a motor for each vehicle having a differential; said motor driving the rear wheels through the differential, an endless track for the vehicles comprising spaced non-guiding runways on which the wheels of the vehicles run; said track having return curves, pivot means for each vehicle connecting all vehicles to each other in an endless train co-extensive of said track; each pivot means being in vertical alignment with, and centrally of, the differential, and guiding means for steering the vehicles; said means arranged to keep the center of each differential centrally of the runways when the vehicle is taking a curve.

WILLIAM C. HODGES, Jr.